(12) United States Patent
Allidieres et al.

(10) Patent No.: US 11,680,746 B2
(45) Date of Patent: Jun. 20, 2023

(54) PROCESS AND PLANT FOR THE PRODUCTION OF LIQUID HYDROGEN

(71) Applicant: L'Air Liquide, Societe Anonyme pour l'Etude et l'Exploitation des Procedes Georges Claude, Paris (FR)

(72) Inventors: Laurent Allidieres, Paris (FR); Gregoire Rigout, Les Loges-en-Josas (FR); Pierre Barjhoux, Sassenage (FR); Pierre-Germain Marlier, Paris (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 352 days.

(21) Appl. No.: 16/923,896

(22) Filed: Jul. 8, 2020

(65) Prior Publication Data
US 2021/0010751 A1 Jan. 14, 2021

(30) Foreign Application Priority Data
Jul. 8, 2019 (FR) ...................................... 1907571

(51) Int. Cl.
| | |
|---|---|
| *F25J 1/02* | (2006.01) |
| *F25J 1/00* | (2006.01) |
| *F17C 1/12* | (2006.01) |

(52) U.S. Cl.
CPC ................. *F25J 1/001* (2013.01); *F17C 1/12* (2013.01); *F17C 2221/012* (2013.01); *F17C 2225/041* (2013.01); *F17C 2270/01* (2013.01)

(58) Field of Classification Search
CPC ................. F25J 1/001; F17C 2221/012; F17C 2225/041; F17C 2270/01; Y02P 80/20; Y02P 90/45
See application file for complete search history.

(56) References Cited

U.S. PATENT DOCUMENTS

| | | | |
|---|---|---|---|
| 3,262,276 A | 7/1966 | Fisher | |
| 6,374,617 B1* | 4/2002 | Bonaquist | ............... F25J 1/0225 60/520 |
| 2011/0132429 A1 | 6/2011 | Kaufman | |

(Continued)

FOREIGN PATENT DOCUMENTS

| | | | | |
|---|---|---|---|---|
| CN | 107 779 906 | | 3/2018 | |
| FR | 3 017 009 | | 7/2015 | |
| WO | WO-2016066571 A1 * | 5/2016 | | ............... C01B 3/08 |

OTHER PUBLICATIONS

French Search Report and Written Opinion for FR 1907571, dated Mar. 25, 2020.

*Primary Examiner* — John F Pettitt, III
(74) *Attorney, Agent, or Firm* — Justin K. Murray

(57) ABSTRACT

Process and plant for the production of liquid hydrogen with a liquefier that has a variable cooling power dependent on the electrical power consumed. The liquefier is supplied with electricity by a first source of electricity at least one additional source of electricity that provides an intermittent or variable amount of electricity over time. Liquid hydrogen is produced at first thermodynamic conditions when the liquefier is supplied with a predetermined nominal electrical energy level and produced at subcooled conditions, with respect to the first thermodynamic conditions, when electricity supplied to the liquefier exceeds the nominal level.

15 Claims, 1 Drawing Sheet

(56) References Cited

U.S. PATENT DOCUMENTS

| | | | |
|---|---|---|---|
| 2014/0079593 A1* | 3/2014 | Naito | B01J 19/0046 |
| | | | 422/111 |
| 2017/0321332 A1 | 11/2017 | Gupta et al. | |
| 2018/0347897 A1* | 12/2018 | Cardella | F25J 1/0268 |
| 2019/0137171 A1* | 5/2019 | Barclay | F25J 1/0225 |

* cited by examiner

PROCESS AND PLANT FOR THE PRODUCTION OF LIQUID HYDROGEN

CROSS-REFERENCE TO RELATED APPLICATIONS

This application claims the benefit of priority under 35 U.S.C. § 119 (a) and (b) to French patent application No. FR 1907571, filed Jul. 8, 2019, the entire contents of which are incorporated herein by reference.

BACKGROUND

Field of the Invention

The invention relates to a process and a plant for the production of liquid hydrogen.

The invention more particularly relates to a process for the production of liquid hydrogen by means of a liquefier fed by a source of gaseous hydrogen, the liquefier being of the electric type and having a variable cooling power dependent on the electrical power consumed, the liquefier being supplied with electricity by a first source of electricity and being connected to at least one additional source of electricity providing an amount of electricity which is intermittent or variable over time.

Related Art

Due to its density, liquid hydrogen is favored in its gaseous state when large amounts of product have to be transported over large distances. Another advantage of liquid hydrogen is related to its density and the high storage capacity in a service station for the filling of tanks of fuel cell vehicles.

The low density of liquid hydrogen in comparison with water, for example, limits the pressure available by hydrostatic height. At low temperature, this can result in fairly high losses by evaporation during transfers.

The systems for loading lorries and tanks in factories for the liquefaction of hydrogen can result in losses which can range up to 15% of production (0.2% loss from the tank, 5% by flash vaporization in the valve for filling the tank and 10% in the processes for filling the lorries).

These losses by evaporation can, of course, be recovered, reheated, recompressed and reinjected into the liquefier. This requires investing in a system for recirculation of the losses and overengineering the liquefaction system.

Another possible solution with some types of liquefiers (in particular those operating with a helium-based cycle) is to subcool the liquid hydrogen below its saturation temperature. This makes it possible to compensate for the losses by evaporation during the filling phases by using cold hydrogen in the tanks in order to recondense the flash vaporizations. This subcooling is obtained to the detriment of the specific energy of the liquefier (as it is necessary to further add a specific energy for subcooling to the specific energy for liquefaction at the saturation temperature of the liquid).

The liquefaction of hydrogen requires a fairly high electrical energy: of the order of 6 to 14 kWh per kilogram of liquefied hydrogen (depending on the liquefaction technologies and sizes of factories). In order to reduce the carbon footprint of the liquefaction process, it is advantageous to couple the liquefier to a source of renewable energy, which can be intermittent, such as a solar or wind source.

The intermittency of the renewable electrical sources renders the operation of a liquefier extremely difficult for reasons of stability of the process. For this reason, liquefaction plants are generally not supplied by intermittent energy sources. This is because the liquefier is generally physically integrated in the factory for production of gaseous hydrogen (most of the time by natural gas reforming), this production of gaseous hydrogen also having, for reasons of durability of the items of equipment, to operate under stabilized conditions.

SUMMARY OF THE INVENTION

One aim of the present invention is to overcome all or part of the disadvantages of the prior art which are found above.

To this end, the process according to the invention, otherwise in accordance with the generic definition which the above preamble gives thereof, is essentially characterized in that liquid hydrogen is produced by the liquefier at first thermodynamic conditions when the liquefier is supplied with electricity at a predetermined nominal electrical energy level and in that, when the liquefier is supplied with electricity at an energy level exceeding the said nominal level, the hydrogen produced by the liquefier is subcooled with respect to the first thermodynamic conditions.

This makes it possible to use the intermittent energy when it is available to subcool, if appropriate from time to time, the production of a helium-cycle liquefier which operates at a stable liquefaction flow rate at a stable liquefaction power. This subcooling power, which comes to be added to the liquefaction power, fluctuates according to the supply of renewable energy/energies which is/are available.

Moreover, embodiments of the invention can comprise one or more of the following characteristics:
- when the liquefier is supplied with electricity at the nominal electrical energy level, the liquid hydrogen produced by the liquefier is in the saturated state,
- when the liquefier is supplied with electricity at an energy level exceeding the said nominal level, the liquid hydrogen produced by the liquefier is subcooled with respect to its saturated state,
- at least a portion of the electrical energy exceeding the said nominal level which is provided to the liquefier is used by the liquefier to subcool the liquid hydrogen produced to a temperature lower than its saturation temperature,
- at least a portion of the electrical energy exceeding the said nominal level which is provided to the liquefier is provided by the at least one additional source of electricity,
- the liquefier is configured in order to produce an amount of liquid hydrogen which is predetermined over time with a zero or non-zero level of subcooling which is a function of the level of electrical energy exceeding the said nominal level with which it is provided,
- the subcooled hydrogen produced by the liquefier has a temperature lowered by 0.01 to almost 7 K, in particular between 0.001 and 4 K, with respect to the first thermodynamic conditions, down in particular to a temperature which can reach the temperature level of the triple point of hydrogen, that is to say 13.8 K,
- the level of electrical energy exceeding the said nominal level can vary between 0% and 25% and in particular between 0% and 15% of the nominal electrical energy level,
- the first source of electricity comprises a power grid to which the liquefier is connected, the at least one additional source of electricity comprises at least one between: a generator of electricity of wind type, a generator of electricity of solar type, the liquid hydrogen produced by the liquefier is transferred into a liquid storage facility, when the liquefier is supplied with electricity at the predetermined nominal electrical energy level, the liquid hydrogen produced by the liquefier is transferred into the tank at the first thermodynamic conditions corresponding to the bubble point of hydrogen at the storage pressure in the tank and, when the liquefier is supplied with electricity at an energy level exceeding the said nominal level, the hydrogen produced by the liquefier at this same flow rate is transferred into the tank at a temperature lower than the bubble point of hydrogen at the storage pressure in the tank, the liquid hydrogen is produced by the liquefier with a stable or unchanging flow rate.

The invention also relates to a plant for the production of liquid hydrogen comprising a liquefier, a source of gaseous hydrogen connected to the liquefier, the liquefier being of the electric type and having a variable cooling power which depends on the electrical power consumed, the plant comprising a first source of electricity connected to the liquefier in order to supply the latter with electricity, at least one additional source of electricity which provides an amount of electricity which is intermittent or variable over time and which is connected to the liquefier in order to supply the latter with electricity, the plant additionally comprising an electronic controller configured in order to manage the refrigerating power of the liquefier in order to produce liquid hydrogen at first thermodynamic conditions, when the latter is supplied with electricity at a predetermined nominal electrical energy level, or in order to produce liquid hydrogen which is subcooled with respect to the first thermodynamic conditions, when the liquefier is supplied with electricity at an energy level exceeding the said nominal level.

According to other possible embodiments:

the electronic controller is electrically connected to the first source of electricity, to the at least one additional source of electricity and to the liquefier, the electronic controller being configured in order to supply the liquefier with electricity at a predetermined nominal electrical energy level from the first source of electricity and in order to supply with electricity at a greater electrical energy level than the predetermined nominal level by supplementing the electrical energy provided by the first source of electricity with the available additional electrical energy provided by the at least one additional source of electricity.

The invention can also relate to any alternative process or device comprising any combination of the characteristics above or below in the context of the claims.

BRIEF DESCRIPTION OF THE FIGURES

Other distinguishing features and advantages will become apparent on reading the description below, made with reference to the figures, in which.

DETAILED DESCRIPTION OF THE INVENTION

Figure 1:
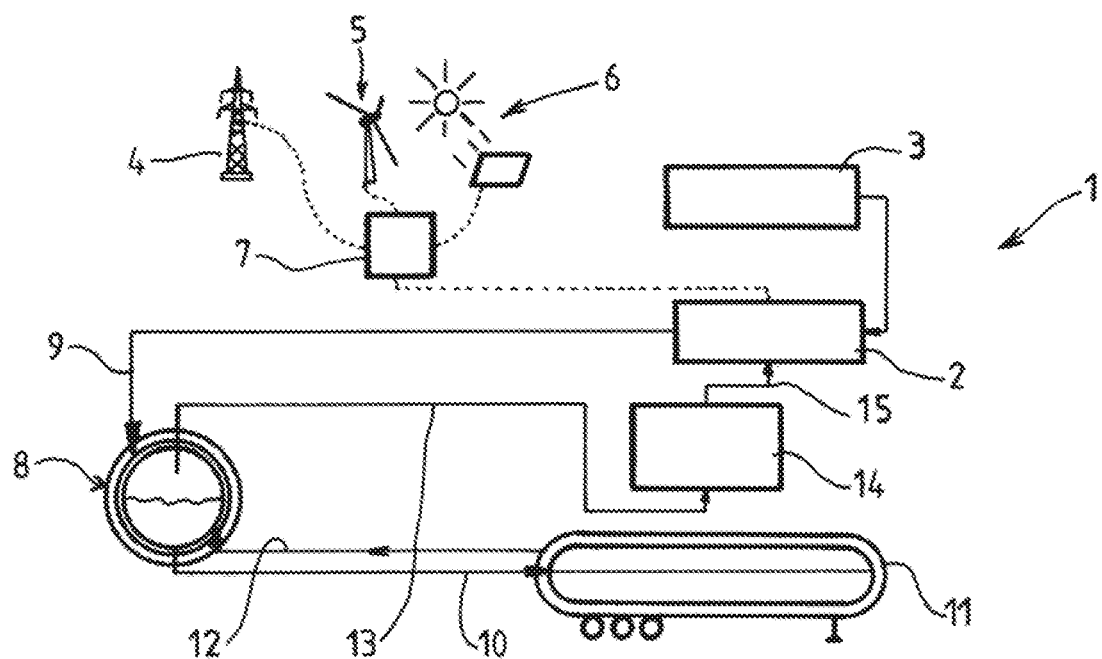
FIG. 1 represents a diagrammatic and partial view illustrating an example of structure and of operation of a plant in accordance with the invention.

The plant 1 for production of liquid hydrogen comprises a liquefier 2 connected to a source 3 of gaseous hydrogen. The source 3 of gaseous hydrogen comprises, for example, a natural gas reforming (SMR) unit producing gaseous hydrogen provided to the liquefier 2. One or more other gas sources may be provided. Thus, the source 3 can comprise a hydrogen network and/or a unit for the production of hydrogen (for example steam reforming and/or by electrolysis or any other appropriate source). The source 3 can thus also comprise the recovery of hydrogen from an impure source (refinery residue gas, inevitable hydrogen originating from a chlor-alkali electrolyser, and the like).

The source 3 of hydrogen provides, for example, a stable flow rate of (preferably pure) hydrogen to be liquefied having a pressure which can be between 7 and 150 bar abs and at ambient temperature.

In the case of an SMR, the latter preferably produces an unchanging flow rate so of hydrogen between a maximum flow rate accepted by the liquefier and a minimum flow rate of reduced functioning of the liquefier 2 (typically, the minimum flow rate is 30% to 40% of the maximum flow rate). The rate of change in flow rate is preferably of the order of a few percent of the instantaneous flow rate per minute.

The liquefier 2 is of the electrical type and has a variable cooling power which is depends on the electrical power consumed. For example, and without this being limiting for all that, the liquefier 2 can be a liquefier using a working fluid comprising helium ("helium-cycle liquefier" but another working gas can be envisaged: nitrogen, or any other mixture, and the like) which provides a compression (compressors), a cooling, a reduction in pressure (turbine(s)) and a reheating. In particular, the liquefying power can be controlled by managing the rotational speed of one or more motors for driving the compressors. These motors can be electric motors (synchronous high-speed motors on magnetic bearings in particular). The compressors are preferably direct drive centrifugal compressors making possible a high output. The power of the turbine or turbines can advantageously be recovered and used to reduce the consumption of the motor or motors. Thus, by increasing the speed of the motors (and thus the flow rate in the cycle of the working gas), the refrigerating power produced and thus the electrical consumption of the liquefier are increased (and vice versa).

For example, the liquefier 2 can produce a stable flow rate of liquid hydrogen between its bubble point and its solidification point at the pressure for feeding from the source 3 of gaseous hydrogen minus the head losses of the gas in the heat exchangers of the said liquefier (of the order of a few hundred millibars).

For example, the liquefier 2 makes possible a production of 100 kg of hydrogen per day to more than 100 tonnes per day. This capacity is adjusted according to its subcooling power and the availability of electricity.

Such a liquefier can be of the "Turbo Brayton" type sold by the Applicant, which can provide in particular a refrigeration and a liquefaction of 15 K to 20 K.

The liquefier 2 is thus an electrical machine connected to a first source 4 of electricity for supplying the liquefier with electricity. This first electrical source (main source) is preferably stable and is or comprises, for example, a power grid.

The liquefier 2 is also electrically connected (preferably in parallel) to at least one additional source 5, 6 of electricity. This or these additional source or sources 5, 6 are of the type providing an amount of electricity which is intermittent or variable over time, in particular sources of electricity of renewable type (wind, solar, and the like).

The plant 1 additionally comprises an electronic controller 7 configured in order to manage the refrigerating power of the liquefier 2 in order to produce liquid hydrogen at first thermodynamic conditions, when the liquefier is supplied with electricity at a predetermined nominal electrical energy level (by the first source 4 of electricity), or in order to produce liquid hydrogen subcooled with respect to the first thermodynamic conditions, when the liquefier 2 is supplied with electricity at an energy level exceeding the said nominal level (by the first source 4 of electricity supplemented by at least one additional source 5, 6).

The electronic controller 7 comprises, for example, a microprocessor, a computer or any other appropriate means.

The electronic controller 7 is preferably configured in order to make it possible to manage the amount of energy necessary for the liquefaction of the hydrogen as a function of the demand for saturated liquid hydrogen and in order to manage the excess renewable electrical energy to provide the subcooling.

The first source 4 of electricity provides, for example, the electrical energy necessary to liquefy a predetermined amount of hydrogen at its bubble point.

Thus, the flow rate of saturated liquid produced by the liquefier 2 can be unchanging but the level of subcooling can be exclusively achieved with the energy contributed, if appropriate, by the variable and intermittent source or sources 5, 6 of excess renewable energy.

Figure 2:
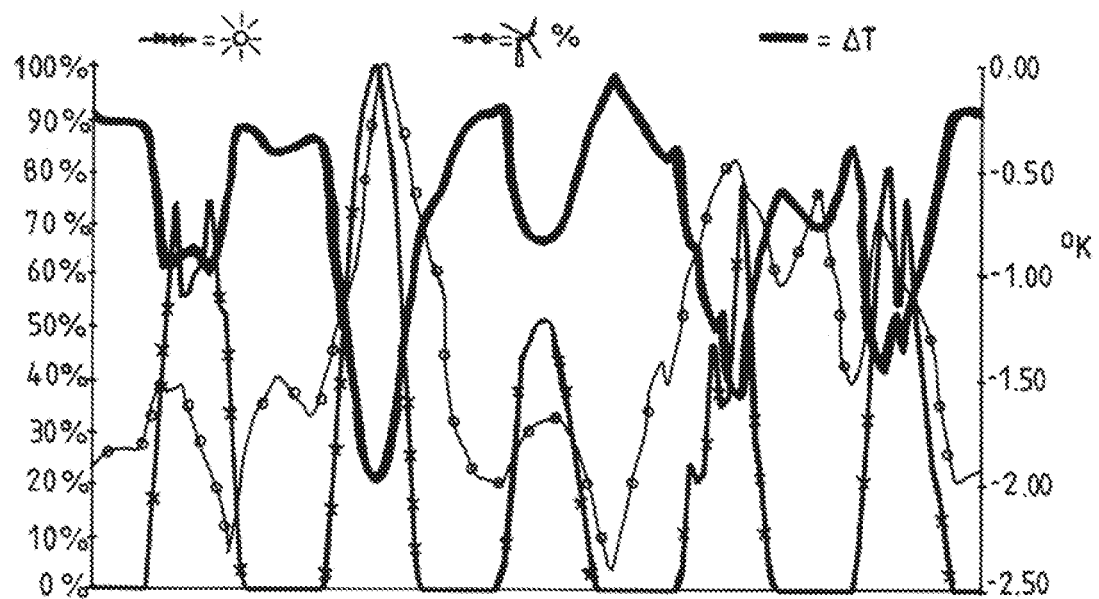
FIG. 2 represents a diagrammatic and partial view illustrating an example of the variations in the electrical power, the supplying and the liquefying power of the liquefier of the plant.

An example of such variations is illustrated in [FIG. 2]. The curves with crosses and circles respectively represent the variations with the time t of the amounts of energy which are produced from respectively a solar source and a wind source between 0% and 100% of a predetermined amount. The third curve represents the variation with the time t (in K) of the subcooling ($\Delta T$) of the hydrogen produced by the liquefier 2. The subcooling is thus proportionally greater when the total renewable energy available is high.

The liquefier having a variable cooling capacity makes it possible to use the intermittent energy when it is available. This can make it possible to access preferential electricity tariffs (typically to use the solar surplus during the day or the wind surplus in the case of a storm). These tariffs can even be negative in some cases.

This configuration makes it possible to generate, at reduced cost, a subcooled hydrogen necessary for the reduction in the losses by evaporation while using, as source, a system for the stable production of hydrogen, such as an SMR, and while liquefying a stable flow rate.

As illustrated, the liquid hydrogen produced by the liquefier 2 can be transferred into a liquid storage facility 8 via a pipe 9. This storage facility can be vacuum insulated and can have a size corresponding, for example, to several days of production by the liquefier (for example five days).

Conventionally, the pressure in the storage facility 8 can be regulated, for example at a fixed value (for example between 1.05 and 11 bar, for example between 1.1 and 5 bar, in particular 2.5 bar absolute). This pressure can also result from an equilibrium between a liquid phase and a gas at saturation in thermodynamic equilibrium. In the case of a subcooled hydrogen storage facility, use will advantageously be made of the large volume of the storage facility to inject the subcooled hydrogen at the vessel bottom and to thus promote a vertical stratification in temperature of the hydrogen in the liquid so that the hydrogen in equilibrium at the liquid/gas interface is warmer than the liquid hydrogen at the vessel bottom. In the same way, the gas phase will be stratified vertically in temperature.

Pressure of storage facility 8 is understood to mean, for example, the mean pressure in the storage facility or in the bottom part of the storage facility or in the upper part (in the gas headspace). This is because, as a result of the low density of hydrogen, the pressure in the lower part of the storage facility is substantially equal to the pressure in the upper part.

The plant 1 thus forms a system for the storage of renewable energy in the form of subcooled hydrogen. The advantage with respect to a conventional system for storage in the form of liquid hydrogen is its operational simplicity. This is because any factory for the liquefaction of hydrogen which has available an adaptive process for the liquefaction of hydrogen and which makes subcooling possible can be converted into such an energy storage system.

This liquid storage facility 8 can be used to fill (for example via at least one pipe 10) mobile tanks 11, such as liquid tanks carried by semi-trailers (capacity of 1000 to 4000 kg, for example). This pipe 10 can be provided with a valve, for example a piloted valve, and/or a pump or other.

These tanks 11 can be filled with liquid hydrogen in the vicinity of saturation, in particular with flow rates of 1000 to 2000 kg per hour, for example. A recovery pipe 12 can be provided in order to return the gas vaporized in the tanks 11 during the filling thereof (for example between 1 and 12 bars of pressure and at a flow rate of between 100 and 200 kg per hour). These losses originating from the vaporization of the liquid in the tank to be filled or the pipelines can be all the more reduced since the liquid hydrogen is injected with a non-zero subcooling level.

A return pipe 13 can be provided in order to return the vaporization gas which is created in the storage facility 8 (due to entries of heat) to a recovery system 14. This cooled gas has, for example, a pressure of between 1 and 12 bars and a flow rate of the order of 0.1% to 1% of the capacity of the storage facility 8 per day. This recovery system 14 can comprise a heater, a storage facility and a recirculation compressor.

This recovered gas can be returned to the liquefier 2 for the reliquefaction thereof via a pipe 15.

In this way, the additional cost of the subcooling can be decreased by the ratio of costs of the excess intermittent energy to the base energy.

For example, between 0% and 10% of the liquefaction electrical energy can be used for the subcooling of the hydrogen.

This solution can be applied to other gases than hydrogen and in particular natural gas.

The plant 1 might additionally comprise a transfer pipe having an end connected to the outlet of the liquefier 2 and an end intended to be directly connected to the tank(s) 11 (without passing through the storage facility 8). This transfer pipe can be equipped with a valve (preferably a piloted valve) in order to transfer liquid hydrogen from the liquefier 2 to the tank 11.

The storage facility 8 and the tank 11 can be jacketed and vacuum insulated.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for production of liquid hydrogen though use of a liquefier fed by a source of gaseous hydrogen, the liquefier having a variable cooling power dependent on an amount of electrical power consumed, the liquefier being supplied with electricity by a first source of electricity and at least one additional source of electricity that provides an amount of electricity which is intermittent or variable over time, wherein the liquid hydrogen is produced by the liquefier at first thermodynamic conditions when the liquefier is supplied with the electricity at a predetermined nominal electrical energy level and, when the liquefier is supplied with the electricity at an energy level exceeding the said nominal level, the hydrogen produced by the liquefier is subcooled with respect to the first thermodynamic conditions.

2. The process of claim 1, wherein the liquid hydrogen produced by the liquefier at the first thermodynamic conditions is in a saturated state.

3. The process of claim 1, wherein at least a portion of the electrical energy exceeding the nominal level, which is provided to the liquefier, is provided by the at least one additional source of electricity.

4. The process of claim 1, wherein the liquefier produces an amount of the liquid hydrogen, which is predetermined over time with or without subcooling, wherein the amount of the liquid hydrogen produced during subcooling is a function of the energy level of the electrical energy exceeding the nominal level with which the liquefier is provided.

5. The process of claim 1, wherein a temperature the subcooled hydrogen produced by the liquefier is lowered by 0.01 to less than 7 K, with respect to the first thermodynamic conditions, to the triple point of hydrogen.

6. The process of claim 1, wherein a temperature the subcooled hydrogen produced by the liquefier is lowered by 0.01 to less than 4 K, with respect to the first thermodynamic conditions, to the triple point of hydrogen.

7. The process of claim 1, wherein the electricity at the energy level exceeding the nominal level varies between 0% and 25% of the nominal level.

8. The process of claim 1, wherein the electricity at the energy level exceeding the nominal level varies between 0% and 15% of the nominal level.

9. The process of claim 1, wherein the first source comprises a power grid to which the liquefier is connected.

10. The process of claim 1, wherein the at least one additional source (5, 6) of electricity comprises at least one between: a generator (5) of electricity powered by wind energy, a generator (6) of electricity powered by solar energy.

11. The process of claim 1, wherein the liquid hydrogen produced by the liquefier is transferred into a liquid storage facility.

12. The process of claim 11, wherein:
when the liquefier is supplied with the electricity at the nominal electrical energy level, the liquid hydrogen produced by the liquefier is transferred into a tank at the first thermodynamic conditions, the first thermodynamic conditions corresponding to the bubble point of hydrogen at a storage pressure in the tank; and
when the liquefier is supplied with the electricity at the energy level exceeding the nominal level, the liquid hydrogen produced by the liquefier is transferred into the tank at a temperature lower than the bubble point of hydrogen at the storage pressure in the tank.

13. The process of claim 1, wherein the liquid hydrogen is produced by the liquefier with a stable or unchanging flow rate.

14. A plant for production of liquid hydrogen, comprising a liquefier, a source of gaseous hydrogen connected to the liquefier, a first source of electricity connected to the liquefier in order to supply the liquefier with the electricity, at least one additional source of electricity which provides an amount of electricity which is intermittent or variable over time and which is connected to the liquefier in order to supply the liquefier with electricity, and an electronic controller, wherein:
the liquefier has a variable cooling power which depends on an amount of electrical power consumed;
the electronic controller is adapted and configured to manage a refrigerating power of the liquefier in order to produce the liquid hydrogen at first thermodynamic conditions when the liquefier is supplied with the electricity at a predetermined nominal electrical energy level, and produce the liquid hydrogen, which is subcooled with respect to the first thermodynamic conditions when the liquefier is supplied with the electricity at an energy level exceeding the said nominal level.

15. The plant of claim 14, wherein the electronic controller is electrically connected to the first source of electricity, to the at least one additional source of electricity and to the liquefier, and the electronic controller is further adapted and configured to supply the liquefier with the electricity at the predetermined nominal electrical energy level from the first source, and to supply the liquefier with electricity at a greater electrical energy level than the predetermined nominal level by supplementing the electrical energy provided by the first source of electricity with available additional electrical energy provided by the at least one additional source of electricity.

\* \* \* \* \*